United States Patent [19]
Vergnolle et al.

[11] 3,978,458
[45] Aug. 31, 1976

[54] SELECTIVELY ERASABLE OPTICAL MEMORY SYSTEM UTILIZING A PHOTO EXCITABLE FERROELECTRIC STORAGE PLATE

[75] Inventors: Marie Vergnolle; Jean Marc Rouchon; Francois Micheron, all of Paris, France

[73] Assignee: Thomson-CSF, Paris, France

[22] Filed: Aug. 16, 1974

[21] Appl. No.: 498,218

[30] Foreign Application Priority Data
Aug. 21, 1973 France............................ 73.30303

[52] U.S. Cl..................... 340/173.2; 340/173 LM; 340/173 LS
[51] Int. Cl.² .................. G11C 11/22; G11C 11/42
[58] Field of Search..... 340/173.2, 173 LM, 173 LS

[56] References Cited
UNITED STATES PATENTS

| | | | |
|---|---|---|---|
| 3,517,206 | 6/1970 | Oliver | 340/173 R |
| 3,602,904 | 8/1971 | Cummings | 340/173.2 |
| 3,614,754 | 10/1971 | Cummings | 340/173.2 |
| 3,740,734 | 6/1973 | Maloanado | 340/173 LM |
| 3,792,449 | 2/1974 | Kazan | 340/173.2 |
| 3,823,998 | 7/1974 | Yazaki | 340/173.2 |
| 3,835,459 | 9/1974 | Luke | 340/173.2 |

*Primary Examiner*—Terrell W. Fears
*Attorney, Agent, or Firm*—Cushman, Darby and Cushman

[57] ABSTRACT

The present invention relates to photo excitable ferroelectric optical memory system designed to store, erase, and display light traces. In accordance with the invention, there is provided a system wherein a photoferroelectric plate is placed between a polarizer and a polarization analyzer. Under the combined action of a recording radiation and an external electric field, a photo induced electric is formed in the illuminated zones of the plate. Erasure is obtained by re-illuminating the plate without applying any external field. The optical display is achieved by means of an electric read-out field.

14 Claims, 10 Drawing Figures

SELECTIVELY ERASABLE OPTICAL MEMORY SYSTEM UTILIZING A PHOTO EXCITABLE FERROELECTRIC STORAGE PLATE

The present invention relates to selectively erasable optical memory systems designed to store, erase and display data taking the form of light traces, similar to the waveforms displayed for example upon the screen of a cathode ray tube.

The invention relates, more particularly, to systems in which the storage of optical information is effected within the body of a plate of photo-excitable ferro-electric material.

It is well known to utilise a plate of this kind as a recording medium, in which two coherent radiations are made to interact in order to produce a three-dimensional phase hologram. The 3D hologram is capable of acting as a holographic recording for a set of data embodied within an image. A recording of this kind can be read-out or erased partially but can only produce a complete reconstruction of the set of data. This constitutes a drawback becuase it frequently happens that a requirement exists for a system which makes it possible to record a complex light trace whilst still retaining the possibility of reading it out or erasing it in a partial fashion. The technique of holographic storage of optical data, likewise has the drawback of requiring coherent radiation for recording and read-out functions; it is also relatively complex as far as the data input function is concerned, because it requires the use of a modulator object in the path of one of the two recording beams.

The present invention proposes a system based upon the storage properties of photo excitable ferroelectric materials, which is capable nevertheless of directly recording one or more light traces and offers the possibility of reading them out selectively and erasing them in a partial way. This system makes it possible to carry out recording using incoherent radiation and lends itself to the display of several traces which are distinguished from one another by a colour contrast.

In accordance with the present invention, there is provided: a selectively erasable optical memory system for both storing, erasing, and displaying data in the form of at least one light trace, said system comprising: a storage plate having two substantially parallel major faces, electrical biasing means arranged for providing within said storage plate an external electric field having an orientation substantially parallel to said major faces, optical means provided for respectively recording and erasing said data through the selective illumination of said storage plate, and read-out means arranged for optically displaying the data stored in said storage plate; said storage plate being cut from a photo excitable ferroelectric material whose birefringent property is a quadratic function of the applied electric field; said read-out means comprising a source of radiant energy for illuminating said storage plate, polarizer means positioned between said source and said storage plate, and analyser means arranged for receiving from said storage plate said radiant energy; said optical means comprising a further source of radiant energy selectively illuminating said storage plate in the course of the recording and erasing of said data; the value of said external electric field being set to a predetermined value in the course of the recording of said trace for forming a photo-induced electric field balancing said external field; the value of said external field being reduced to zero in the course of the erasure of any portion of said trace; said erasure being caused by selectively re-illuminating said storage plate with said optical means.

For a better understanding of the present invention, and to show how the same may be carried into effect reference will be made to the ensuing description and the attached figures among which.

The optical memory system in accordance with the invention, utilises by way of recording medium a transparent plate of photo excitable ferroelectric material. In the envisaged application, the object is to use photo-induced refractive index changes to generate a non-uniform variation in the refractive index of ferroelectric plate.

To this end, the material from which the plate is cut, is a photo-sensitive substance having an electro-optical effect. More particularly, appropriate photo excitable ferroelectric substances for this application are ones in which the Curie temperature is lower than ambient temperature, and which exhibit a quadratic electro-optical effect. Under these conditions, the variation $\Delta n$ in the refractive index depends purely upon the intensity of said field and not upon its sign. The variation in refractive index $\Delta n$ in question, is that which occurs when one considers the principal axes of the ferroelectric plate used, and it is known for example that if said plate is cut from a polycrystalline material the principal axes have a fixed orientation in relation to the direction of the applied electric field. In the description which now follows, it will be assumed that the electric field is applied substantially parallel to the major faces of the ferroelectric plate.

The electro-optical effect utilised in accordance with the invention exists in materials having a non-polar crystalline structure. Of these materials, we can point for example to those in which the molecular structure comprises an eight-sided oxygen cell, and by way of non-limitative examples we can refer to barium titanate, strontium-barium-niobate and lead-lanthanum-titano-zirconate.

The materials are in the non-polar phase when they are used above their ferroelectric Curie temperature. In order to reduce Curie temperature, to below ambient temperature, as those skilled in the art will be aware, ion substitutions are made in the crystalline lattice.

A typical example of a polycrystalline material which at ambient temperature has particularly high quadratic electro-optical effect coefficients, is a lead-lanthanum-titano-zirconate having the following chemical composition:

where $x$ is the order of $9.10^{-2}$.

In order for this ferroelectric material to be photosensitive, doping elements are incorporated into it and amongst these we can point for example, albeit in a non-limitative way, to the trivalent iron ion.

The photo excitable ferroelectric materials which satisfy the specifications defined earlier, are characterised by an energy diagram, comprising a valence band and a conduction band separated by a forbidden band the width of which, for example, may range between 3 and 3.5 electron-volts. By reason of the doping, within the forbidden band there exist centres which are photo excitable commencing from energy quanta equal to or greater than two electron-volts. This extrinsic type of photo excitation requires a radiation of wavelength $\lambda$ shorter than or equal to 500 nanometer; it gives rise to the release of electrical charges trapped in the forbidden band and to their transfer to a conduction band where they can diffuse and displace under the influence of an external electric field.

Considering the case of donor centres, located within the body of a photo excitable ferroelectric material, it will be observed that the photo excited electrons, under the action of an external electric field $E_a$, will leave the traps located in the zone illuminated and end up in the adjacent dark zone where they are deeply trapped. This migration of charges which have been released, gives rise to a space charge since the illuminated zone acquires a positive charge and the adjacent trapping zone acquires a negative charge. The photo induced electric field $E_e$ which manifests the existence of this charge, opposes the external field $E_a$ and all that is left in the illuminated zone is the residual field $E_m$ equal to $E_a - E_e$. The lifetime of the space charge thus developed can reach as much as several weeks and in the case where the photo-electrons are deeply trapped, no applied electric field is sufficiently intense to dislodge them from the traps which have captured them.

Figure 1:
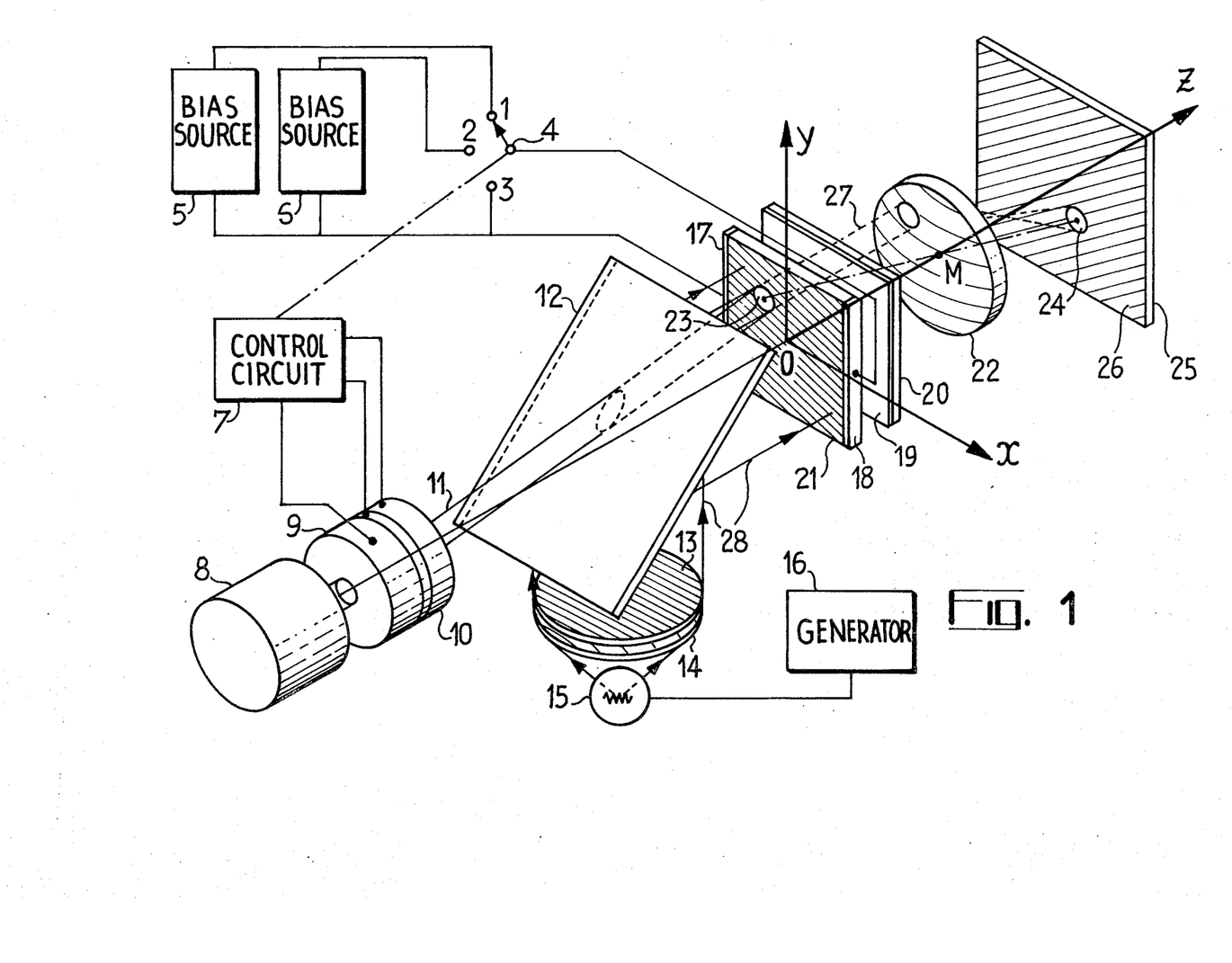
FIG. 1 is an isometric view of a data storage and display system in accordance with the invention.

In FIG. 1, an optical store system can be seen which employs the principles outlined hereinbefore.

This system comprises a photo excitable ferroelectric plate 21 whose major faces are parallel to the plane XOY. The electrodes 17 et 18 make it possible to induce in the plate 21 an external electric field having a direction parallel to OX and to this end the electrodes are connected to bias sources 5 and 6 through a switching device 4. FIG. 1 shows, by way of non-limitative example, optical means for recording a light trace 32 in the storage plane XY of the plate 21. These optical recording means comprise a light source 8, an electrically controlled shutter 9 and an electrically controlled optical deflector 10. The intensity-modulated and deflected light beam 11 illuminates a zone 23 of the plate 21 after having passed through a semi-transparent plate 12. Under the action of control signals coming from a control circuit 7, the spot can scan a trace of arbitrary shape on the plane XOY; this trace translates the data to which the circuit 7 responds. Without departing from the scope of the invention, it is conceivable that the optical recording means 8, 9 and 10 could be replaced by an arbitrary optical system making it possible to project onto the plate 21 an image for recording.

The only condition imposed upon the optical recording means is that the radiant energy emerging from them should be capable of photo-excitation of the plate 7 in order that the light trace is continuous with dark zones. The system of FIG. 1 likewise comprises optical read-out means constituted, for example, by a light source 15 supplied from a generator 16, and by an assembly of optical elements designed to produce a substantially parallel light beam, to polarize it and to analyse it after transmission through the plate 21. FIG. 1 therefore shows a condenser lens 14 and a polarizer 13 which transmit towards the semi-transparent plate 12 a polarized beam 28. After reflection, this beam 28 illuminates the plate 21 at a normal angle of incidence and at this level has a polarisation direction which, preferentially, is orientated along the bisector of the axes OX and OY. On emerging from the plate 21, the beam 28 passes through a rectilinear polarisation analyser 20 which can, as FIG. 1 shows, be preceded by a quarterwave plate 19.

The radiation emerging from the polarisation analyser 20 can be used to project onto a screen 25, the image of the plate 21. To this end, in FIG. 1 an objective lens 22 can be seen whose conjugate planes coincide with the plate 21 and with the screen 25. The correspondence between the trace 23 and its image 24 is symbolised by the rectilinear chain-dotted segment which passes through the optical centre M of the objective lens 22; the light beam 27 represents the radiation fraction contained in beam 28 emerging from the trace 23; this beam 27 should not be confused with the beam 11 which is used to record the trace 23.

The operation of the system shown in FIG. 1 can be split into three phases namely:

a phase of recording the trace 23, a phase of selective erasing thereof and a phase of read-out or display.

Figure 2:
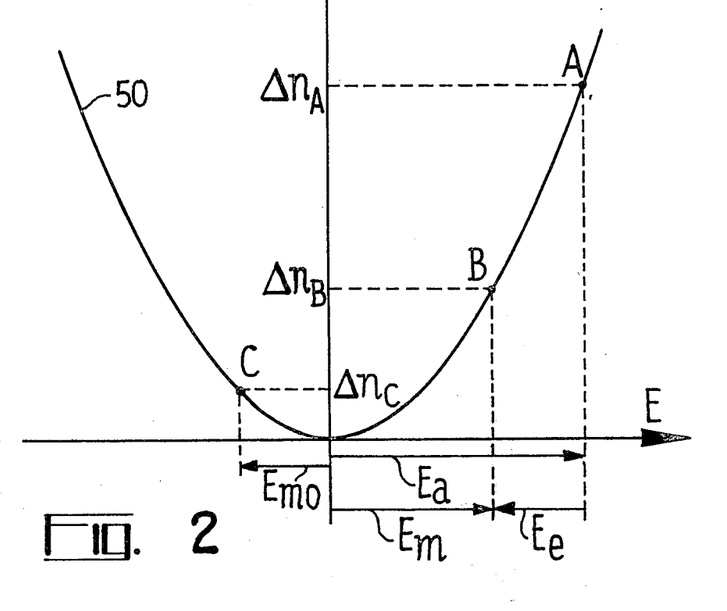
FIGS. 2 and 3 are explanatory diagrams.

In FIG. 2, a diagram can be seen which illustrates as a function of the intensity of the electric field E applied to the plate 21, the difference $\Delta n$ in the refractive indices which it exhibits due to double-refraction, for light vibrations orientated along its principal axes.

Figure 3:
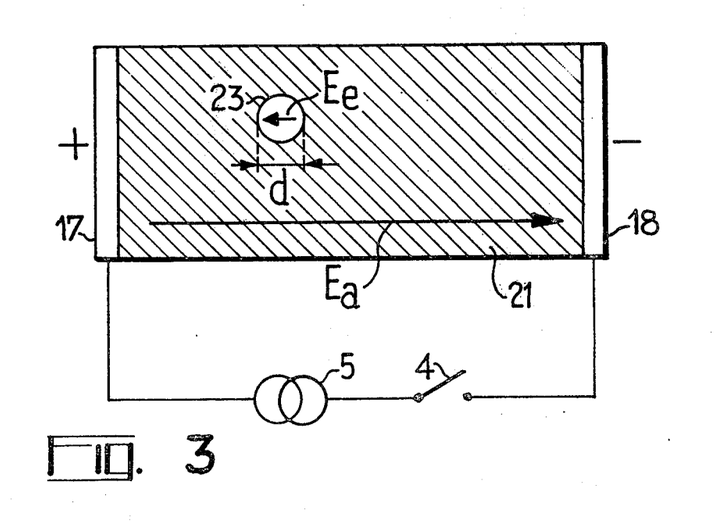

FIG. 3 illustrates the plate 21 seen from the front, with the electrical bias means 5, 4, 17 and 18. A circular light trace 23 of diameter d has been shown in FIG. 3, surrounded by a cross-hatched dark zone.

To record the trace 23, it is necessary to simultaneously open the shutter 9 and apply to the electrodes 17 and 18, a predetermined bias voltage. This voltage is furnished by the source 5 by connecting the switch 4 to position 1. The external electric field $E_a$ is thus applied to the overall volume of the plate 21 and, since the trace 23 is photo-excited, the creation of a photo induced electric field $E_e$ will be observed, due to charge displacement, and this tends to cancel the intensity of the external electric field $E_a$ in the photo-excited zone.

At the start of the recording phase, the electric field is uniform in the plate and, on the square-law characteristic 50 of FIG. 2, the double-refracting condition of the plate 21 can be plotted at A. The external electric field $E_a$ thus commences by inducing a double-refraction phenomenon of value $\Delta n_A$ which is maintained throughout the whole of the cross-hatched portion of the plate 21. By contrast, in the zone 23 on to which the light trace is projected, the photo-excitation gives rise to the development of a photo induced electric field $E_e$ which brings the local double-refracting condition from the position A back to the position B where the deviation $\Delta n$ is only $\Delta n_B$. Thus, the combined effect of the recording light and the external electric field $E_a$ makes it possible to loally modify the double-refraction phenomenon, and if this action is prolonged it is possible to cancel said phenomenon.

If, at the point B, the action is interrupted, there is left in the presence of $E_e$ a residual field $E_M$ in the zone occupied by the trace 23. If the external field $E_a$ is cancelled, the residual field acquires the value $E_{mo}$ which is equal to $E_e$; the double-refracting state shifts from the point B to the point C on the square-law characteristic 50 and the value $\Delta n = \Delta n_c$ is obtained. The object of the recording phase is to create two separate double-refracting states, between the photo-excited zone and that which is not thus excited. There is a choice between two values of $\Delta n$ which correspond to working points on the diagram of FIG. 2 whose abscissae values differ from one another by the amount of the photo induced electric field $E_e$. In addition, the top limit on this value is the value or in other words the strength of the external electric field $E_a$. It goes without saying that the photo excited zone is in no way limited to the circular form and that by displacement of the recording beam 11 in the plane XOY, any desired shape or pattern can be produced.

The phase of selective erasing of certain portions of a trace which has already been recorded, consists in re-illuminating these portions without applying the external field $E_a$. To do this, it is necessary to open the shutter 9 at the locations of the trace which it is desired to erase and simultaneously to place the switch 4 in the position 3. Under the effect of the incident radiation, the residual field $E_{mo}$ is completely dissolved and the double-refraction storage plate is restored to the initial condition.

The phase of read-out of the data stored in the plate 21 consists in displaying the non-uniform double-refraction distribution induced in the plate 21, after the phases of recording and erasing. This display is based upon the principle of chromatic polarization and has recourse to the read-out source 15 whose radiation will preferentially be chosen to lie outside the range for which the plate 21 has been photo-sensitised. The plate 21 is supplied with a read-out radiation, polarized along the bisector of its principal axes OX and OY, emanating from the source 15 which can be monochromatic or polychromatic in nature. In those zones of the plate 21 located outside the trace 23 and in the absence of any external electric field $E_a$, the differential phase-shift is zero and the wave retains its incident polarization when it encounters the polarization analyser 19–20. If we assume the quaterwave 19 to be absent, then the rectilinear analyzer 20 can be crossed in relation to the polarizer 13 in order to cancel out the read-out radiation emerging from the latter. The image 26 is the location of a photo induced electric fluid $E_2$, in the absence of the external electric field $E_a$, and a differential phase-shift $2\pi\Delta n_c e/\lambda$
is produced where $e$ is the thickness of the plate 21 and $\lambda$ the wavelength of the read-out radiation 28. The polarization of the radiation fraction contained in the beam 27, is modified and the consequence of this is that the image 24 of the trace 23 is illuminated, except at wavelengths for which the zone 23 of the plate 21 behaves as a half-wave plate. On introducing the quarterwave plate 19, whose principal axes are aligned parallel with those of the plate 21, the aspect of the image projected onto the screen 25 can be changed. If the source 15 is polychromatic, the dark zone 26 becomes coloured and the zone 24 assumes a different shade.

Figure 4:
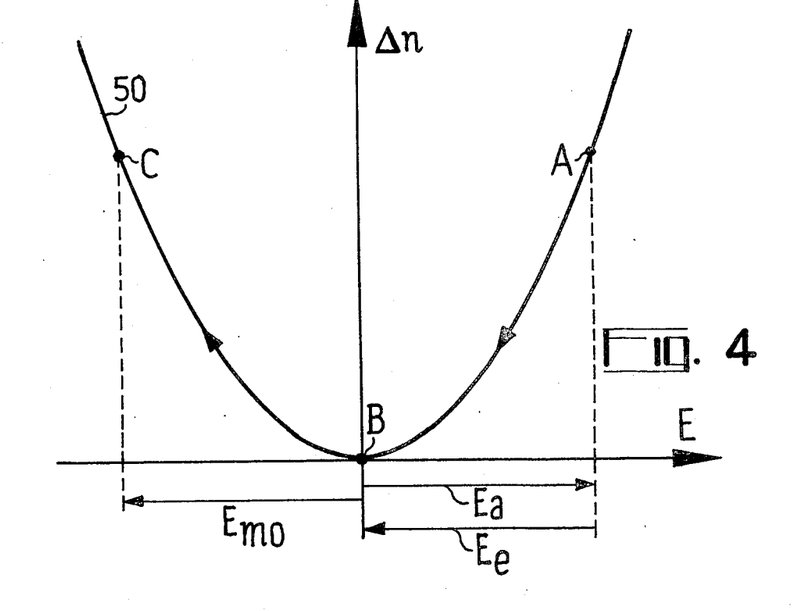
FIGS. 4 and 5 are diagrams illustrating a mode of embodiment relating to the recording of two separate traces.
Figure 5:
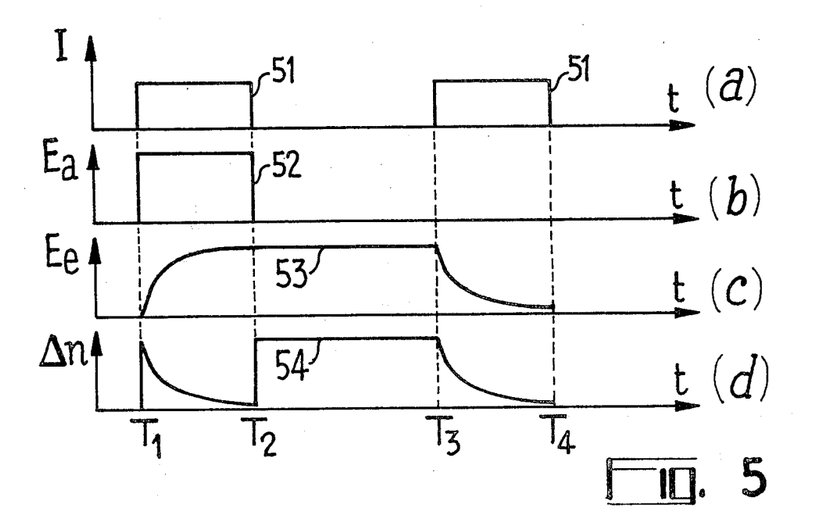

The colour contrast between the zones 24 and 26 can be modified at will, if the switch 4 is connected to position 2. In this position, an electrical bias source 6 makes it possible to apply between the electrodes 17 and 18 a read-out voltage the value of which is chosen in order to achieve a good contrast between the zones 24 and 26. FIG. 4 and 5 illustrate a particular case of operation of the system of FIG. 1, for which photo-excitation is continued during the recording phase until the photo induced electric field $E_c$ reaches the same value as the external electric $E_a$. In FIG. 5, at (a), the variation with time, of the intensity I of the recording or erase radiation, can be seen. The time interval $T_1$, $T_2$ illustrates the recording phase and the time interval $T_3$, $T_4$ the erase phase. The photo-excitatory radiation is applied in the form of pulses 51 whose amplitude-duration product is sufficient for the value of the photo induced electric field $E_e$, to reach that of the field $E_a$. At (b) it can be seen how the field $E_a$ is applied between the instants $T_1$ and $T_2$, in accordance with the waveform 52; the result, at (c) is a rise in the photo induced electric field $E_e$ in accordance with an asymptotic law 53, tending towards the value $E_a$. Simultaneously, the refractive index deviation $\Delta n$ tends to cancel out, as shown at (d) in graph 54. This recording phase is represented in FIG. 4, by the displacement of the working point from A to B of the square-law curve 50. Between the instants $T_2$ and $T_3$, the photo induced electric field retains it value and read-out of the recorder trace can be carried out.

Figure 6:
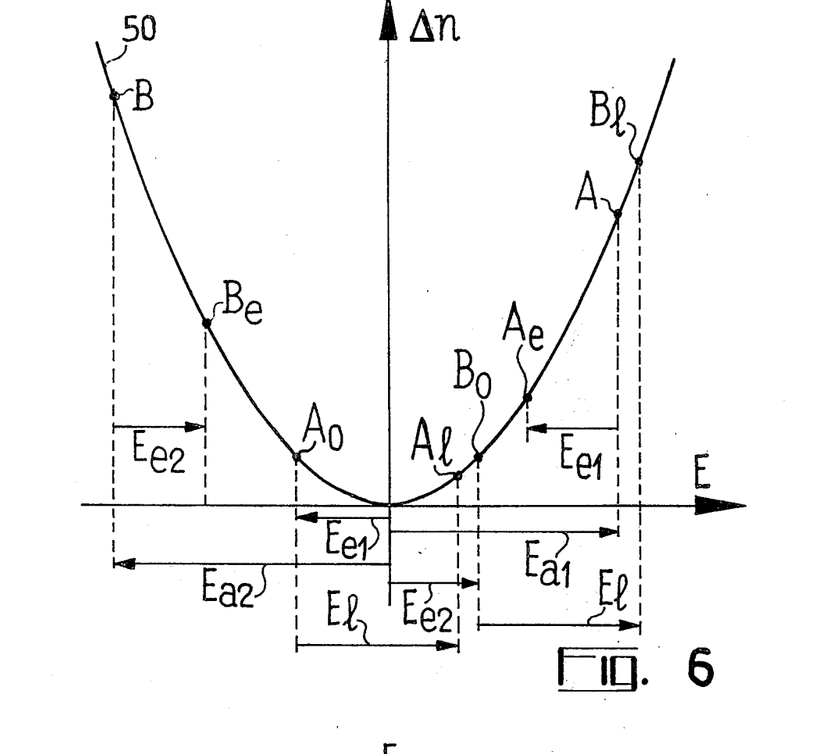
FIGS. 6 and 7 illustrate modifications using two successively applied traces of Different values.
Figure 7:
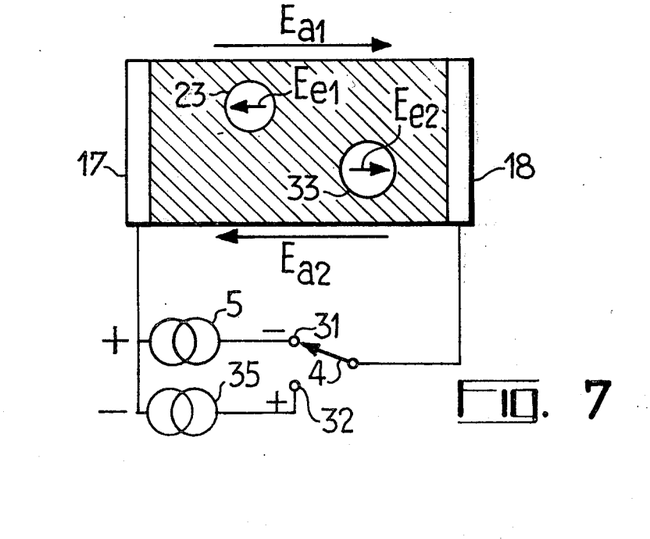

At the instant $T_3$, the photo-excitation radiation is applied again, without applying the external electric field $E_a$. The result is an asymptotic decrease in the photo induced electric field $E_e$ and in the refractive index deviation $\Delta n$. In FIG. 4, the erasing which takes place between the instants $T_3$ and $T_4$ has its commencement illustrated by the point C on the graph 50, and the process develops towards the point B. Read-out with zero applied field, takes place at the point C of the characteristic 50, with a residual field equal to $E_{mo}$ in the neighbouring zones. Read-out can also be carried out in the presence of the external electric field $E_a$, with residual fields which are zero occupied by the trace and equal to $E_a$ around said zone. FIG. 6 and 7 describe the operation of the system in accordance with the invention in the situation where two separate traces 23 and 33 are successively recorded using different values $E_{a1}$ and $E_{a2}$ of the applied field.

The traces 23 and 33 are respectively recorded using two different values $E_{a1}$ and $E_{a2}$ of the external electric field. To this end, two electrical bias sources are alternately connected by the switch 4 to the electrodes 17 and 18. The field $E_{a1}$ is applied with the switch 4 in the position 31 and places the working point at A upon the characteristic 50 shown in FIG. 6. When the irradiation of the trace 23 is complete, the working point is located at $A_e$ due to the information of the photo induced electric field $E_{e1}$. When the external electric field $E_{a1}$ is cancelled, the working point shifts to $A_o$, with a residual equal to the photo induced electric field $E_{e1}$. Similarly, for the trace 33, successively the points B, $B_e$ and $B_o$ are produced to which there correspond the field $E_{a2}$, $E_{a2} - E_{a2}$ and $E_{a2}$.

To read-out the recorded traces in order to be able to distinguish them from one another, there is applied to the plate an external read-out field $E_1$ which shifts the working points $A_o$ and $B_o$ respectively to $A_1$ and $B_1$. Thus, different values of $\Delta n$ are obtained for the two traces 23 and 33 and the result is an intensity or colour contrast which makes it possible to distinghuish them from each other. If zero-field read-out is carried out, it will be seen that the points $A_o$ and $B_o$ occupy positions which do not enable different values of Δn to be obtained, by reason of the square-law nature of the graph 50.

It should be noted that it is the photo induced electric field $E_c$ which, by its value and sign, renders it possible to effect a distinction between several recorded traces.

To obtain different values of photo induced electric field, it is possible equally to act either on the value of the external electric field $E_a$ or upon its sign. It is equally possible to differentiate the traces using the same external electric field $E_a$ but by employing different irradiation doses for the traces; making this hypothesis, it is possible to modify the intensity or duration of application of the recording radiation. It is equally possible to adopt the same conditions of application of the recording light but to arrange things in such a way that the external electric field is canelled before the end of the irradiation of one of the two traces, in order to produce partial erasing and thus ensure differentiation between the traces.

Figure 8:
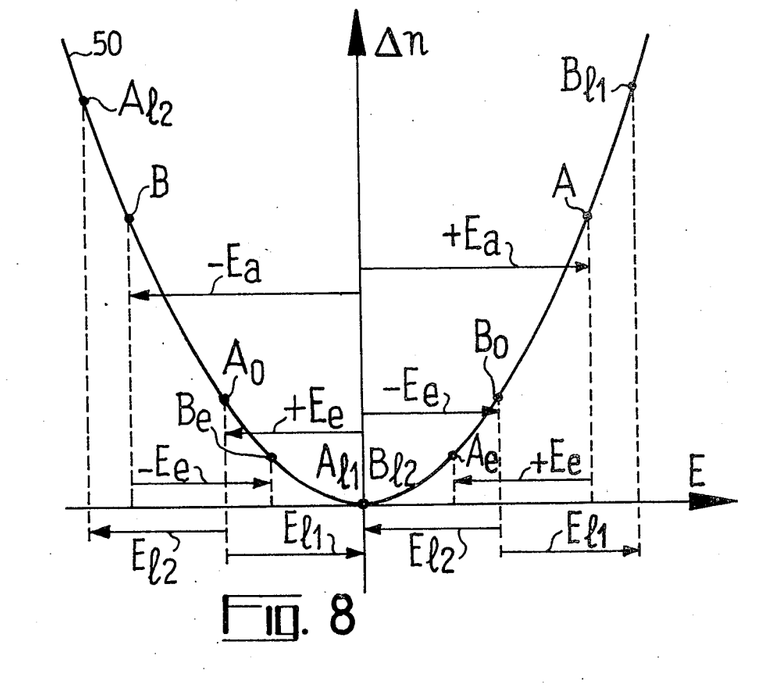
FIG. 8 is an explanatory diagram relating to the two-trace mode of operation.

FIG. 8 illustrates a mode of operation using two traces, in accordance with which, in order to selectively read-out the traces, the read-out external electric field is given two distinct values $E_{11}$ and $E_{12}$.

In FIG. 8, the working points A, $A_e$ and $A_o$, as well as those B, $B_e$ and $B_o$, can be seen, these respectively marking the commencement of the recording phase, the end of the latter and the zero field storage state. To read out the trace 23 corresponding to the point A, during read-out a field $E_{12}$ is applied the value of which is chosen in order to cancel out the Δn corresponding to the trace 33. Under these conditions, the point respresenting the trace 23 shifts the $A_{12}$ and the point representing the trace 33 moves on the characteristic 50 to the point $B_{12}$ where no variation in refracting index is observed. To read out the other trace 33, the read-out field $E_{11}$ is applied, this having the effect of cancelling the Δn pertaining to the trace 23; the reading out of the trace 33 takes place at the working point $B_{11}$ and that of the trace 23 at the working point $A_{11}$. All those parts of the plate 21 outside the two traces, are subjected either to $E_{11}$ or to $E_{12}$, the values being chosen in order to give a value of Δn which is small compared with that which renders one of the two traces clearly visible.

Figure 9:
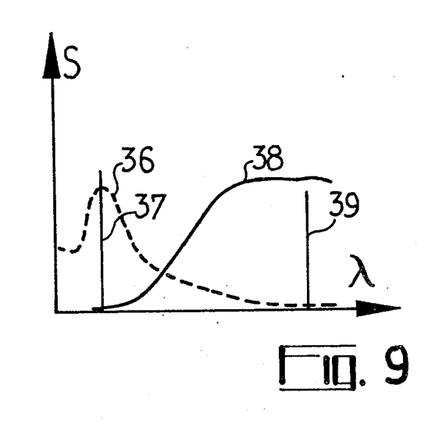
FIG. 9 illustrates the spectral characteristics of the radiations employed in the system in accordance with the invention.

As far as the characteristic of the radiations which can be used, for the recording and display of the recorded data, are concerned, in FIG. 9 a diagram can be seen showing the graph 36 of the spectral sensitivity S of the photo excitable ferroelectric material as a function of the wavelength λ. The recording radiation can advantageously be constituted by a monochromatic radiation 3 of short wavelength, the spectrum line 37 of which is located at the peak sensitivity of the curve 36. For read-out, recourse can be had to a monochromatic radiation the spectrum line 39 of which is located in the region of low sensitivity of the photo excitable ferroelectric material.

It is equally possible to effect read-out by means of a polychromatic radiation source whose emission spectrum 38 exhibits a decrease in intensity towards the short wavelengths. To achieve this decrease in intensity towards short wavelengths, there can be associated with a white light source, an optical filter which only transmits the blue or ultra-violet regions of the source emission spectrum.

In the foregoing, a pair of electrodes 17 and 18 arranged at the two opposite edges of a rectangular plate were used. This solution requires the use of relatively high voltage if the plate is of substantial size.

Figure 10:
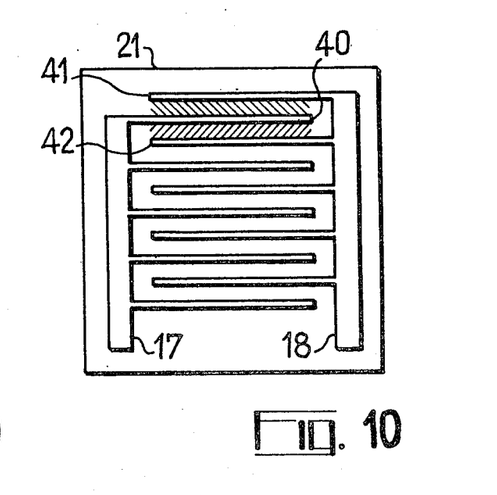
FIG. 10 illustrates a detailed embodiment of the system in accordance with FIG. 1.

In practice, it is possible to produce polycrystalline plates having an area of 10 cm². In this case, it is advantageous to have recourse to electrodes 17 and 18 arranged on one of the faces of the plates 21, in the manner shown in FIG. 10. The form given to these electrodes is that of interdigital comb structures the teeth of which 41, 40 and 42 delimit interdigital spaces, picked out by cross-hatching, where the recording of the light traces can take place.

It should be noted that the overall erasing of the traces stored in the photo excitable ferroelectric plate, can be achieved in the absence of any applied field, by effecting a complete scan of its surface, or again by using heating means which are capable of temporarily raising the material to a temperature sufficient to erase the space charges created at the time of recording of the traces.

What we claim is:

1. Selectively erasable optical memory system for storing erasing and displaying data in form of at least one light trace, said system comprising: a storage plate having two substantially parallel major faces, electrical biasing means arranged for providing within said storage plate an external electric field having an orientation substantially parallel to said major faces, optical means provided for respectively recording and erasing said data through the selective illumination of said storage plate along one of said major faces, read-out means arranged for optically displaying the data stored in said storage plate, and control means for simultaneously controlling said electrical biasing means and said optical means to successively effect storage erasure and display of said data; said storage plate being cut from a photo excitable ferroelectric material whose birefringent property is a quadratic function of the applied electric field; said read-out means comprising a source of radiant energy for illuminating said storage plate along one of said major faces, polarizer means positioned between said source and said storage plate, and analyser means arranged for receiving from said storage plate said radiant energy; said optical means comprising a further source of radiant energy selectively illuminating said storage plate in the course of the recording and erasing of said data; said electrical biasing means comprising switching means actuated by said control means for setting the value of said external electric field to a predetermined value in the course of the storage of said trace for forming in the portion of said storage plate receiving said selective illumination of photo-induced electric field balancing said external electric field; said switching means making the value of said external field to reduce to zero for causing the erasure of data stored in any portion of said storage plate under the selective re-illumination thereof with said optical means.

2. Optical memory system as claimed in claim 1, for storing at least two distinct light traces, wherein in the course of the recording in succession of said light traces photo-induced electric fields of distinct algebraic values are respectively produced under the control of said switching means.

3. Optical memory system as claimed in claim 1, wherein in the course of said erasure, the value of said photo-induced electric field undergoes a full cancellation.

4. Optical memory system as claimed in claim 1, wherein said switching means are actuated for cancelling out said external electric field in the course of the display of non erased stored data.

5. Optical memory system as claimed in claim 1, wherein during the phase of displaying non erased stored data, said switching means set said electric field to at least one value other than zero.

6. Optical memory system as claimed in claim 1, wherein said electrical bias means further comprise at least one voltage source, and two electrodes arranged on said storage plate; said switching means selectively connecting said voltage source to said electrodes under the control of said control means.

7. Optical memory system as claimed in claim 1, wherein said analyser means is a rectilinear polarisation analyser whose direction of polarisation is perpendicular to the polarization direction of said polarizer means.

8. Optical memory system as claimed in claim 7, wherein said read-out means comprise, between said polarizer means and said analyser, a quarterwave optical plate.

9. Optical memory system as claimed in claim 1, wherein said optical means and read-out means have common optical mixer means; said storage plate being arranged for receiving the recording and read-out radiations which emerge from said optical mixer means.

10. Optical memory system as claimed in claim 8, wherein said storage plate is a polycrystalline plate; the orientation of said external electric field bisecting said polarisation directions; said quarterwave plate having one of its principal axes parallel to the orientation of said external electric field.

11. Optical memory system as claimed in claim 6, wherein said electrodes are constituted by two interdigital comb-type conductors arranged on one of the major faces of said storage plate.

12. Optical memory system as claimed in claim 7, wherein said read-out means comprise a projection objective lens receiving the radiation emerging from said polarisation analyser and a display screen; said lens forming the image of said storage plate on said display screen.

13. Optical memory system as claimed in claim 1, wherein said optical means comprise, between said source and said storage plate, optical modulator means and optical deflector means controlled by said control means.

14. Optical memory system as claimed in claim 1, further comprising heating means associated with said storage plate for raising the latter to a temperature sufficient to fully erase the photo-induced electrical space charges created within said storage plate during the course of said storage phase.

* * * * *